United States Patent [19]

Semerdjiev et al.

[11] 4,315,726
[45] Feb. 16, 1982

[54] DISTRIBUTING DEVICE FOR MACHINES FOR INJECTION MOLDING OF THERMOPLASTIC PARTS WITH SOLID SKIN AND CELLULAR CORE

[75] Inventors: Stefan G. Semerdjiev; Nikolay T. Popov, both of Sofia, Bulgaria

[73] Assignee: Institute po Metaloznanie i Technologia na Metalite, Sofia, Bulgaria

[21] Appl. No.: 145,233

[22] Filed: Apr. 30, 1980

[51] Int. Cl.³ .............................................. B29D 27/00
[52] U.S. Cl. .................................. 425/560; 264/45.5; 264/328.19; 264/DIG. 83; 425/817 R
[58] Field of Search ........................... 425/560, 817 R; 264/45.5, DIG. 83, 328.19

[56] References Cited

U.S. PATENT DOCUMENTS

| | | | |
|---|---|---|---|
| 3,247,304 | 4/1966 | Ninneman | 264/328.19 |
| 3,268,636 | 8/1966 | Angell | 264/DIG. 83 |
| 3,296,353 | 1/1967 | Nouel | 264/328.19 X |
| 3,372,434 | 3/1968 | Hendry | 425/558 X |
| 3,687,582 | 8/1972 | Hendry et al. | 264/45.5 X |
| 3,694,529 | 9/1972 | Josephsen et al. | 264/DIG. 83 |
| 3,776,989 | 12/1973 | Annis et al. | 264/328.19 X |
| 3,793,410 | 2/1974 | Garner | 264/DIG. 83 |
| 3,812,228 | 5/1974 | Skoroszewski | 264/DIG. 83 |
| 3,894,823 | 7/1975 | Hanning | 264/DIG. 83 |
| 3,937,447 | 2/1976 | Alwes et al. | 264/DIG. 83 |
| 3,960,996 | 6/1976 | Balevski et al. | 264/DIG. 83 |
| 4,124,308 | 11/1978 | Sokolow | 264/DIG. 83 |

FOREIGN PATENT DOCUMENTS 112730 5/1975 German Democratic Rep. .
1409057 10/1975 United Kingdom .
1501747 2/1978 United Kingdom .

*Primary Examiner*—Philip Anderson
*Attorney, Agent, or Firm*—Karl F. Ross

[57] ABSTRACT

A molding apparatus in which a slider is slidable in an inclined channel into which a passage opens at one side for communication with a mold cavity while a pair of passages open at the opposite side for communication with a plasticating (worm) cylinder and a further cylinder provided with a plunger or piston. The slider has a U-shaped passage, the arms of which are positioned to interconnect both of the passages on the other side of the channel in a position of the slider in which the passage to the mold is blocked but which connects only the accumulating cylinder passage through the bight of the U-shaped passage to the mold in another position of the slider. A check valve is provided in the passage of the worm cylinder.

1 Claim, 1 Drawing Figure

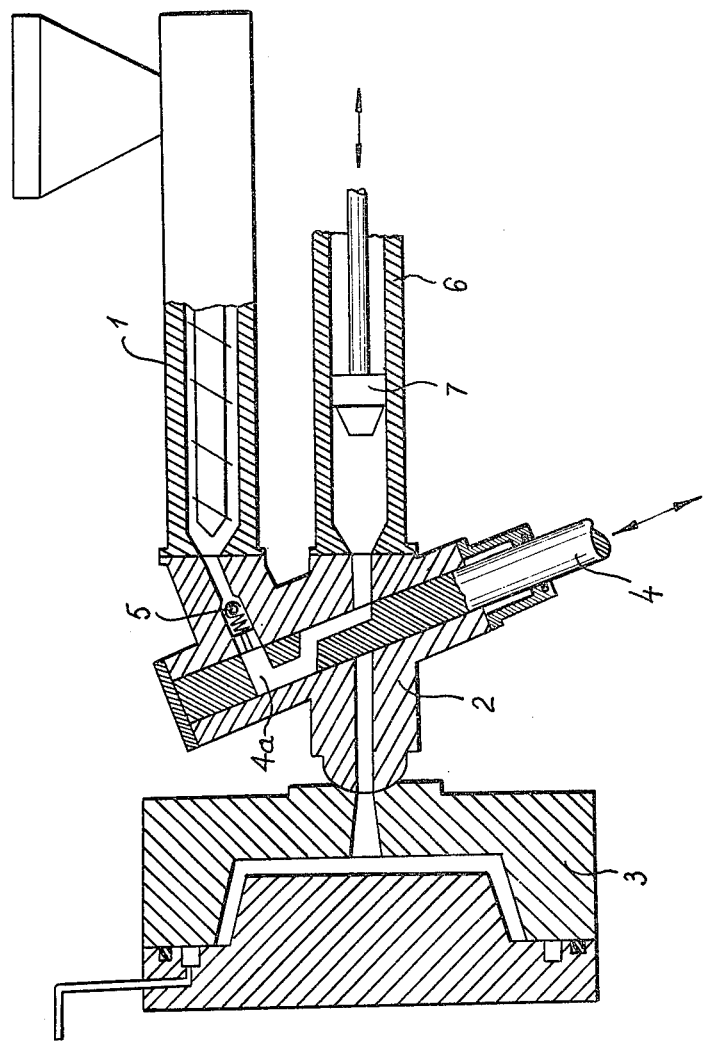

DISTRIBUTING DEVICE FOR MACHINES FOR INJECTION MOLDING OF THERMOPLASTIC PARTS WITH SOLID SKIN AND CELLULAR CORE

FIELD OF THE INVENTION

This invention relates to a distributing device for injection molding machines for the production of thermoplastic bodies with a solid skin and a cellular core, particularly for molding by the gas counter-pressure method, as disclosed in Bulgarian Pat. No. 18242.

BACKGROUND OF THE INVENTION

There are known distributing devices for machines of this type which are used for injection molding by the low-pressure process. In one of them, the foamable polymer melt streams are controlled by a rotating three-position valve or two two-position valves, while in machines for molding by the gas counter-pressure method there is also used a distributing device, which is disposed between an accumulating cylinder, the injection mold and the plasticating unit; this device comprising a non-return valve between the plasticating unit and the accumulating cylinder.

A drawback of these known distributing devices for machines of this type lies in that, because of the direct connection between plasticating unit, mold and accumulating cylinder, there is the possibility that not only fresh or virgin plasticated material will be introduced into the mold, but also material already foamed during the previous cycle before the formation of a skin, thus impairing the quality of the latter. Another drawback lies in the necessity of separate devices for the actuation and control of the valves.

OBJECT OF THE INVENTION

Therefore, it is a general object of this invention to provide a distributing device for machines for injection molding of thermoplastic bodies with a solid skin and a cellular core, in which the control unit performs the functions of the known distributing devices without any danger of deterioration of the virgin unfoamed polymer, the device to be of compact construction, simply actuated and controlled, and suitable for incorporation in different injection molding machines for the production of structural foam bodies by low or high pressure, as well as by the gas counter-pressure method.

SUMMARY OF THE INVENTION

This object is achieved in a distributing device for machines for the injection molding of thermoplastic bodies with a solid skin and a cellular core, disposed between a plasticating unit, an accumulating cylinder with an injection ram and the mold. The device comprises a two-position plunger with reciprocating motion and a distributing U-shaped communication channel, both ends of this channel being open towards the plasticating unit and the accumulating cylinder, respectively, while in the opposite side this channel is open towards the mold, and at the outlet of the plasticating unit there is provided a nonreturn or check valve. The connection between the plasticating unit and the accumulating cylinder is effected through the communication channel within the plunger. This distributing device uses the simple two-position linear motion of the plunger, which allows ready incorporation in the systems for actuation and control of any type of machine for injection molding of structural foam parts, while the U-shaped communication channel provides for the introduction only of virgin polymer material into the mold until the skin is formed and for the filling-up of the core portion of the molded body with foamed material from the previous cycle only at the end of the moulding cycle, since there is no direct connection between the plasticating unit and the mold. Moreover, the compactness of the distributing device and the suitability for its incorporation in machines of different design contribute to its versatility which contributes to a greater versatility of the machine, making it possible for them to produce by different processes bodies with smooth and uniformly colored surfaces without swirl patterns and flow marks and, hence, to eliminate the necessity of additional finishing operations such as polishing and painting.

BRIEF DESCRIPTION OF THE DRAWING

For a better understanding of the invention reference should be made to the accompanying drawing in which the sole FIGURE is a cross section illustrating a preferred embodiment of the invention.

SPECIFIC DESCRIPTION

The illustrated device comprises a body 2 disposed between a worm-type plasticating unit 1, a mold 3 and an accumulating cylinder 6 parallel to but laterally spaced from unit 1, a two-position plunger 4, moving inside a blind bore machined at an angle to the direction of injection in body 2 (i.e. at an angle to the axes of the feed passage and units 1 and 6), which in its one side side is shaped as a connector with the injection channel, pressed against the mold 3, while at its opposite side there are machined two other channels ending with adjoining surfaces, oriented, with regard to the attachment of body 2 to the plasticating unit 1 and the the accumulating cylinder 6, in the direction of injection. In an enlarged portion of the channel towards the plasticating unit 1 there is provided a nonreturn or check valve 5, while the connection of plasticating unit 1 to the accumulating cylinder 6 and of the accumulating cylinder 6 to the mold 3 is effected through a U-shaped communication channel machined in the two-position plunger 4, both end ends of this channel being open towards the plasticating unit 1 and the accumulating cylinder 6, respectively, while in its opposite side this U-shaped channel is open toward the mold 3.

The operation of the distributing device is as follows:

When the pressure inside the plasticating unit 1 is increased above a preset magnitude, the non-return valve 5 is opened and lets through plasticated material, which passes through the U-shaped communication channel 4a within plunger 4 into the accumulating cylinder 6 until it fills a preset volume, the plunger 4 being in upper position, which connects the plasticating unit 1 to the accumulating cylinder 6. After moving the plunger 4 in bottom position, in which the accumulating cylinder 6 is connected to the mold 3, there is provided a possibility for filling the latter with polymer material, as well as for the formation of a cellular core in the interior of the molded body after the formation of a solid skin by egression of excess melt into the accumulating cylinder 6 as a result of retraction of the injection ram 7. At upper position of plunger 4, the injection channel towards the mold is closed and the molded body can be removed. After compression by the injection ram 7 of the excess foamed material within the accumulating cylinder 6, this material is pushed towards the front part of the cylinder by the entering virgin material introduced from the plasticating unit 1 for the next molding cycle; after this, by moving plunger 4 into its bottom position, first virgin material and then compressed foamed material from the previous cycle are fed to the mold by plunger 7.

What we claim is:

1. An injection molding apparatus for the production of thermoplastic bodies having a continuous skin and a cellular core, said apparatus comprising:

a mold having the shape of a body to be produced and provided with a mold cavity formed with an inlet for foamable synthetic resin material;

a plasticating unit including a worm and worm cylinder for preparation of said synthetic resin material, said plasticating unit having an outlet spaced from said mold;

an accumulating cylinder laterally spaced from and parallel to the cylinder of said plasticating unit and provided with a piston; and a distributing device disposed between said plasticating unit, said accumulating cylinder and said mold, said distributing device comprising:

a distributing body formed with a channel inclined to the axes of said cylinders, means forming a first passage communicating with said inlet and open at one side of said channel, means forming a second passage communicating with said outlet of said plasticating unit and opening at a side of said channel opposite said one side, a third passage communicating with said accumulating cylinder and opening at said opposite side of said channel, a two-position slider shiftable in said channel and formed with a generally U-shaped passage having respective arms communicating with said second and third passages in one position of said slider in which said slider blocks said first passage, said U-shaped passage having a bight region communicating with said first passage when one of said arms communicates with said third passage in a second position of said slider blocking said second passage, and a check valve in said second passage blocking flow of synthetic resin material through said second passage toward said plasticating unit.

* * * * *